United States Patent [19]

Feiner et al.

[11] 3,882,276

[45] May 6, 1975

[54] CONFERENCING SYSTEM UTILIZING OPPOSITELY PHASED HYBRIDS

[75] Inventors: Alexander Feiner; Dennis Bryan James, both of Rumson, N.J.

[73] Assignee: Bell Telephone Laboratories, Incorporated, Murray Hill, N.J.

[22] Filed: Mar. 22, 1974

[21] Appl. No.: 453,705

[52] U.S. Cl. .......................... 179/1 CN; 179/18 BC

[51] Int. Cl. .......................................... H04m 3/56

[58] Field of Search .. 179/1 CN, 1 H, 18 BC, 2 TV, 179/15 AA, 170 NC

[56] References Cited

UNITED STATES PATENTS 3,108,157 10/1963 Feiner .............................. 179/1 CN
3,761,624 9/1973 Lewis et al. .................... 179/15 AA
3,824,344 7/1974 James et al. ...................... 179/1 CN
3,828,146 8/1974 Lewis .......................... 179/170 NC

*Primary Examiner*—William C. Cooper
*Assistant Examiner*—Thomas D'Amico
*Attorney, Agent, or Firm*—David H. Tannenbaum

[57] ABSTRACT

In lossless or low loss conferencing systems it is customary to use a hybrid to convert each station from 2-wire to 4-wire operation. Because of impedance mismatch conditions, reflections can occur at the hybrid interface thereby causing echo and "singing" problems. Self-cancellation of the reflected signals can be achieved by reversing the phase of the reflected signals through the hybrids and assigning the reversed phase hybrids only to stations connected to the system by trunks. For those stations connected to the system by lines, 5dB pads are used in conjunction with unreversed phase hybrids. In this way complex switching is avoided.

7 Claims, 5 Drawing Figures

CONFERENCING SYSTEM UTILIZING OPPOSITELY PHASED HYBRIDS

FIELD OF THE INVENTION

This invention relates to a conferencing system and, more particularly, to an arrangement for improving the stability of a PBX active energy time division conferencing system.

BACKGROUND OF THE INVENTION

Conventional telephones operate over a pair of conductors where transmission both to the telephone set and from the telephone set occurs over the conductor pair concurrently. This is called 2-wire operation. One manner of connecting a number of such sets together in conference fashion is to connect the pair of conductors in parallel. However, such an arrangement suffers, among other things, from a severe loading problem and the transmission signal level is reduced beyond acceptable limits.

A well-known solution to this problem is to convert the 2-wire telephone lines to 4-wire operation by having the transmission from a station placed on a conductor pair separate from the conductor pair handling transmission to the telephone set. This conversion is accomplished typically by a hybrid circuit. One such hybrid using operational amplifiers to separate the transmission directions is shown in the copending application of T. G. Lewis filed on Mar. 22, 1973, Ser. No. 343,825, now U.S. Pat. No. 3,828,146.

One problem still remains to be solved, namely, the reduction of reflected signals to a point where they will not continue to be amplified thereby causing the system to oscillate or "sing." However, because of the loop lengths to the telephone station sets and because of manufacturing tolerances, repeat coils, filters and other equipment that can be in a telephone line, it is extremely difficult to prevent signals from being reflected by the hybride circuit. Accordingly, when a number of hybrids are connected together singing can occur. And, even when the circuit does not actually break into oscillation, very objectionable echo and distortion will occur as the reflected signals become amplified.

An analysis of the reflected signals reveals that the signals from all stations can be expected to have common characteristics stemming from low impedance at low frequencies due to the hybrid and a repeat coil; dips in the midband due to the capacitance of the cable; and resonances in the band edges due to the cutoff of the filter. The net result of these common features is that the reflections will tend to add in amplitude and phase when stations are connected together to form a conference. Accordingly, a need exists in the art for a conferencing system arranged in a manner so that the reflected signals from stations connected together tend to cancel each other, thereby reducing the total reflected signal and increasing the singing and echo margins.

SUMMARY OF THE INVENTION

In the above-identified Lewis application, and in the copending application of D. B. James and J. R. McEowen, filed Mar. 22, 1973, Ser. No. 343,826, now U.S. Pat. No. 3,824,344 there is shown an active energy hybrid using operational amplifiers to form the hybrid for 2-wire to 4-wire conversion. We have determined that by reversing the polarity of one of the amplifiers the phase of the hybrid can be reversed without in any way interfering with the signal. Therefore, hybrids can be produced having a negative reflected signal phase. If some of the stations were associated with these negative phase hybrids while the other stations had regular phase hybrids, the probability of having a singing or echo condition would decrease. However, the chance would then still remain that stations having the same polarity hybrid would be connected together, in which case the margins would be poor.

One other arrangement that could be utilized would be to have switches built into the line circuit to control the polarity of the hybrid. Under such a system, upon connection of three stations one of the switches would be operated to reverse one of the hybrids, resulting in two circuits adding and a third one subtracting. This would be equivalent, on the average, to a single reflection rather than the sum of three added reflections. Again, this would be a great improvement but arrived at by complicated and costly switches, detectors, and control circuitry.

Still another system would be to build a set of dummy line circuits which, without adding the expense of the telephone, repeat coil, filter, and so forth, would simulate the line with an approximate impedance. The dummy circuit would have a reversed phase and, when a third station is connected to the conference, the dummy circuit would be switched in negating the effect of the third station.

Although all of the above-discussed arrangements would serve to increase the singing and echo margins, none is particularly appealing because of the added costs and complexities of operation.

In PBX operation a number of common interest stations are served by a switching network dedicated only to those stations. The stations are connected to the network by lines and connections are typically established between stations by dialing three or four digits. When it is desired to communicate with a station outside of the common interest group, the regular commercial switching network is used via trunk circuits connected to the PBX network.

We have found that, if the hybrids serving the trunks have a reverse (negative) phase from the hybrids serving the lines, a stable PBX conference system can be constructed. Such a system is arranged with a 5dB pad inserted between stations served by lines such that when two or more lines are connected in conference fashion the 5dB pad reduces the signal level thereby increasing the echo and singing margins. The pad is used to provide a 5dB loss when stations are connected together to reduce signal level to avoid the contrast of signal levels between station-station connections and station-trunk connections. This system is based on the fact that the only source of reflected signals is the hybrids serving the lines and the hybrids serving the trunks. This is accomplished by making all of the other types of circuits which can be connected to the conference bridge, such as the attendant circuit and the tone circuit, full 4-wire circuits, thereby eliminating hybrids with respect to such circuits.

Thus, using the scheme where the phase of the hybrids serving the trunks is reversed from the phase of the hybrids serving the lines, and where the miscellaneous circuits are full 4-wire and where 5dB pads are introduced between line-to-line connections, the following situations can occur:

1. Trunk-to-trunk connection. Due to the near transparency of the transmission, the system remains stable.
2. Station-to-station connection. As above, but even more margin. Since the 5dB pad is switched in to give the correct sound level, this pad further decreases any return signal.
3. Three stations bridged. Although all are of the same phase polarity, the 5dB pads will give the desired margin.
4. Trunk to station. Opposite phase polarity gives low reflected signal levels.
5. Trunk to two stations. One phase inverted and two phases normal gives low reflections.
6. Two trunks and one station. Two phases inverted and one phase normal gives low reflections.
7. Three trunks. Does not occur.

Accordingly, it is a feature of our invention that a PBX conference system is arranged having hybrids of one phase in the line circuits and hybrids of opposite (negative) phase in the trunk circuits for the purpose of increasing echo and singing margins.

It is a further object of our invention that opposite phase hybrids are used in a conference system to increase the echo and singing margins without necessitating the use of complex switching or phase sensing techniques, and without adding extra dummy loads for balancing purposes.

It is a further object of our invention that the phase of an active energy hybrid is reversed internally to the hybrid by an adjustment of the gain of one of the operational amplifiers of the hybrid.

DESCRIPTION OF THE DRAWING

The operation and utilization of the present invention will be more fully apparent from the following description of the drawing, in which.

DETAILED DESCRIPTION

Figure 1:
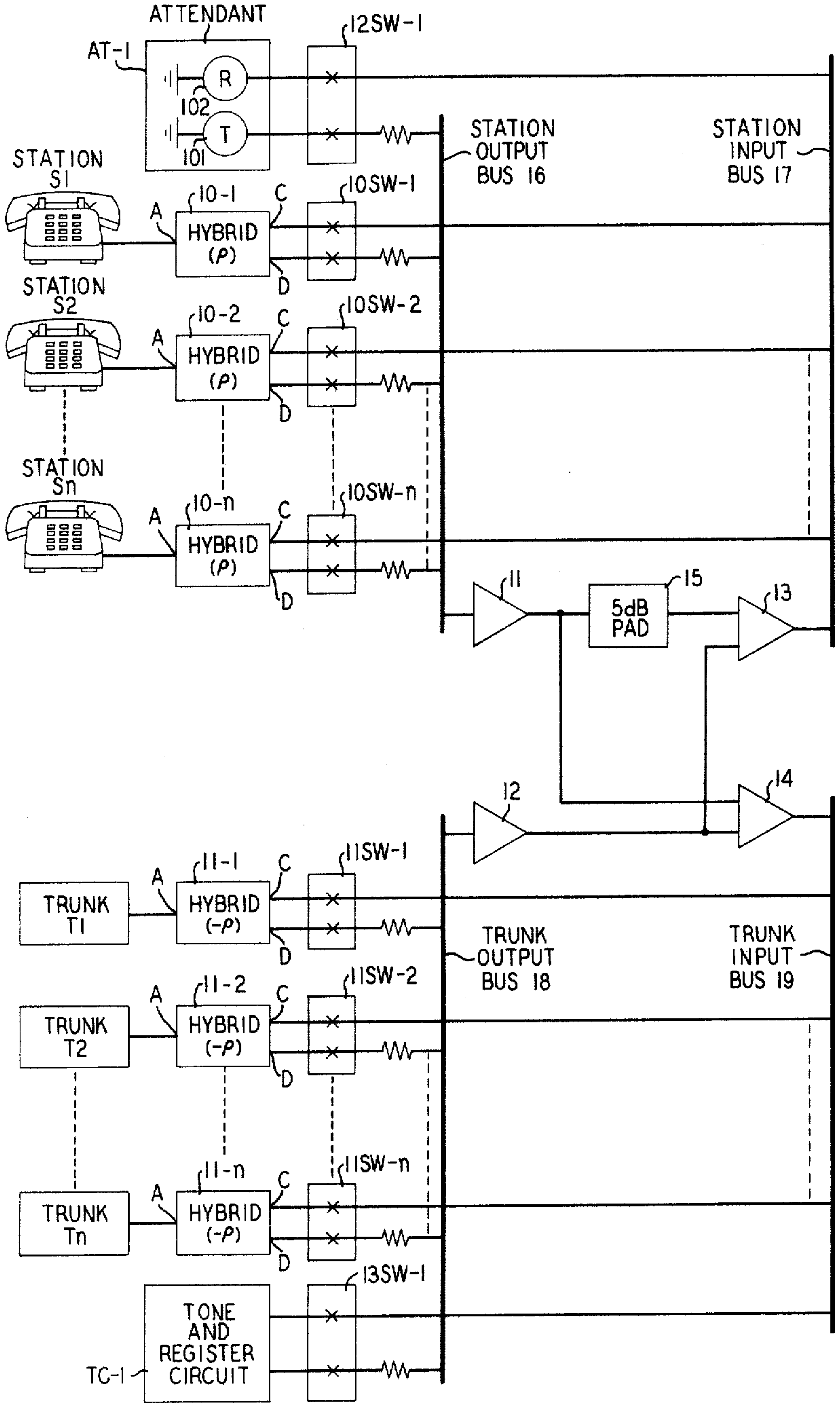
FIG. 1 shows a block diagram schematic of the hybrid conference system.

Turn now to FIG. 1 and assume that a conference connection is to be established between station S1, station S2 and a station connected to the conference network via trunk T1. For establishment of such a connection, station S1 is connected to the A input of hybrid 10-1, which hybrid converts from 2-wire operation on input A to 4-wire operation on outputs C and D. The outgoing transmission from station S1 is placed on lead D via hybrid 10-1 and connected through switch 10SW-1 to station output bus 16. Similarly transmission from station S2 is connected to station output bus 16 via hybrid 10-2 and switch 10SW-2. At the same time, transmission from trunk T1 is connected to trunk output bus 18 via hybrid 11-1 and switch 11SW-1. In the same manner, station input bus 17 is connected to station S1 via switch 10SW-1 and hybrid 10-1 and to station S2 via hybrid 10-2 and switch 10SW-2 while trunk input bus 19 is connected to trunk T1 via hybrid 11-1 and switch 11SW-1.

Communication originating from station S1 then would appear on station output bus 16 and would be transmitted via summing amplifier 11 through 5dB pad 15 and via summing amplifier 13 to station input bus 17 to the input to station S2. Thus, communication originating at station S1 is reduced 5dB in level and applied to the receiver of station S2. At the same time, transmission originating from station S1 or, for that matter from station S2, and communicated to station output bus 16 is communicated via summing amplifier 11 and summing amplifier 14 to trunk input bus 19 and hybrid 11-1 to trunk T1. Accordingly, transmission originating at station S1 or at any other station connected to station output bus 16 is connected without loss to any trunk connected to trunk input bus 19. Transmission originating at trunk T1, on the other hand, passes through hybrid 11-1 and lead D thereof to trunk output bus 18 and via summing amplifier 12 and summing amplifier 14 to trunk input bus 19 and back to any other trunk connected to the conference. This same communication from trunk T1 and trunk output bus 18 is communicated via summing amplifier 12 and summing amplifier 13 to station input bus 17 and to all stations such as stations S1 and S2 connected to that bus.

It should be noted that in such a system as discussed previously the only sources of reflected signals are the hybrids 10-1 through **10-*n* and 11-1 through 11-*n* since the attendant circuit AT-1 is a full 4-wire circuit such that communication from transmitter 101 of the attendant circuit is connected directly to station output bus 16 and does not pass through a hybrid while input signals to receiver 102 from station input bus 17** are connected directly to the receiver, also without need for a hybrid circuit. This is typical 4-wire operation. Similarly, tone circuit TC-1 as well as all other miscellaneous circuits are 4-wire circuits and thus do not add to the echo or singing problems.

STATION-TO-STATION CONNECTIONS

As between stations connected to the conference bridge, 5dB pad 15 is always inserted between the station output bus 16 and the station input bus 17, thereby reducing the transmission signal to a point where echo and oscillations are not a problem. Thus, any reasonable number of stations can be connected together without serious service degradation. When a trunk circuit such as trunk circuit T1 is also connected to the conference connection, the associated hybrid, such as hybrid 11-1, is arranged to have a negative reflection phase with respect to the reflection phase of the hybrids associated with the stations such that the combined reflected signals tend to reduce instead of adding, thereby again increasing the echo and singing margins. Because the system is designed so that more than two trunks cannot be connected to the conference bridge, the problem of adding several negative reflection phase hybrids together is avoided.

OPERATION OF POSITIVE PHASE HYBRID

Figure 2:
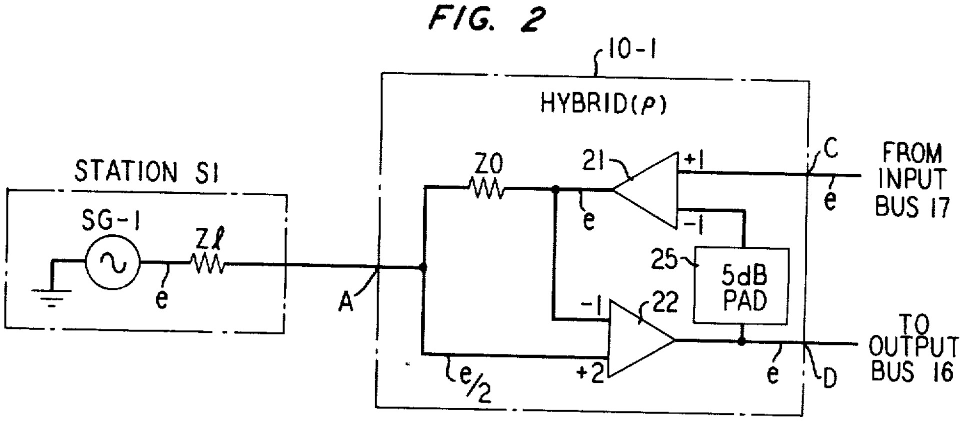
FIG. 2 shows details of the positive hybrid circuit.

FIG. 2 shows a positive reflection hybrid, such as hybrid 10-1, connected to station S1, which station can be represented by signal generator SG-1 and impedance *Zl*. As will be demonstrated hereinafter, the reflection problem would not exist if the reflection coefficient with respect to hybrid 10-1 could be made to be zero.

However, it will be shown that in order to have such a zero return loss, ZO of hybrid 10-1 must be identically equal to Zl. However, in practice, $Zl$ varies with loop length and manufacturing differences in the telephone, repeat coil, filter, et cetera and, thus, it would be complicated and expensive to match exactly ZO with $Zl$. It is therefore practice to choose ZO to match approximately the average value of Zl for the exchange or PBX.

Since ZO does not equal $Zl$ at all frequencies, some of the signal applied to hybrid 10-1 is reflected back through the lower operational amplifier 22 towards the central summing point.

Let Vin be a noise signal originating in one of the summing amplifiers 12, 13, 14 or 15, then the amount of reflection from one circuit is $$\frac{Zl - ZO}{Zl + ZO} V_{in} . \qquad (1)$$

If more than one circuit is bridged, then at the summing point the reflected signal is $$\sum_{i}^{n} \left(\frac{Z\ell - ZO}{Z\ell + ZO}\right)_i V_{in} \qquad (2)$$

and if this signal is greater or equal to $V_{in}$, the system oscillates or sings. Indeed, a large $$\sum_{i}^{n} \left(\frac{Z\ell - ZO}{Z\ell + ZO}\right)_i \qquad (3)$$

gives rise to objectionable echo and gain distortions.

From Equation 3 we see that if the reflection of any of the hybrids can be made to be negative, then this reflection when summed with the reflections from the other hybrids will tend to reduce the total reflected signal since, as pointed out, the signals from all of the stations tend to have very similar characteristics.

REFLECTIONS WITHIN THE HYBRID

The operation of hybrid 10-1 will now be discussed with reference to FIG. 2 for the purpose of illustrating the source of the reflected signals. As shown, hybrid 10-1 includes a pair of operational amplifiers 21 and 22 similar to the operational amplifier known as OP-AMP 741 available from several well-known commercial suppliers. However, as will be more fully developed herein, any type of circuit, whereby the signal arriving at one input is compared to a signal arriving at a second input to produce an output signal which is the difference of the two signals, can be used in place of the operational amplifier shown. As shown in the figures, the positive input of an operational amplifier is the noninverting input while the negative input of an operational amplifier is an inverting input.

Assume now that signal generator SG-1 (representing transmission from station S1) provides an open circuit voltage $e$. Then, because of the voltage divider effect of $Zl$ and ZO, lead A has voltage e/2 thereon. Since the output of operational amplifier 21 is essentially at ground, the $e/2$ signal is amplified back to $e$ by the +2 input of operational amplifier 22. The $e$ signal output of amplifier 22 is then applied to output lead D which, it will be recalled is connected to station output bus 16. This signal, reduced by 5dB but having the same phase, is returned to input C of hybrid 10-1 via input bus 17 in the manner previously discussed. This same signal is also applied to the negative input of amplifier 21 reduced to the same amplitude by 5dB pad 25. Amplifier 21 thereby acts to cancel the signal, thus preventing echo return. In the opposite direction, when signals are applied from another station, such as signal $e$ from input bus 17, they pass through the +1 input of amplifier 21. Since again ZO and $Zl$ act as a voltage divider, the $e$ signal output of amplifier 21 is applied to the +2 input of amplifier 22 as $e/2$. Accordingly, the signals through amplifier 22 cancel each other, thereby preventing reflected signals from returning to output bus 16. However, since exact cancellation depends upon the exact values of ZO and $Zl$ and obtaining of a signal exactly $e/2$, it will be seen that any unbalanced condition between ZO and $Zl$ will result in some reflected signal passing through the hybrid.

It should be noted that the 5dB pad 25 is only necessary when it is desired to reduce the side tone being returned to the station.

NEGATIVE PHASE HYBRID

Figure 3:
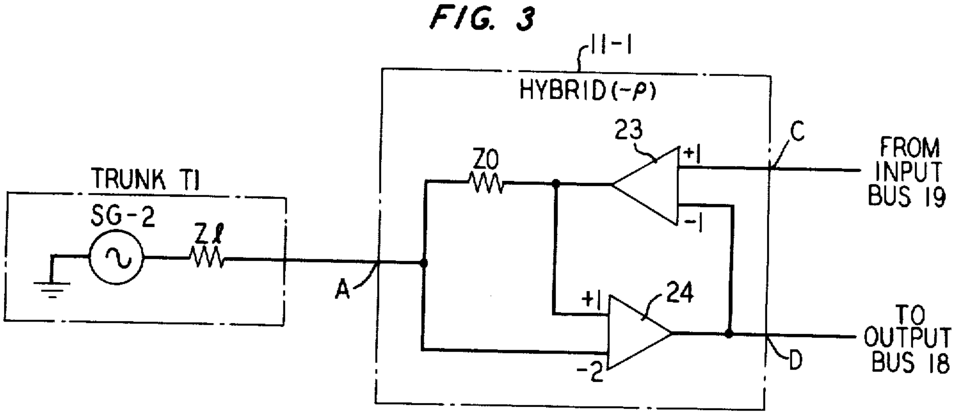
FIG. 3 shows details of the negative hybrid circuit.

FIG. 3 shows a negative phase hybrid 11-1 which operates in the exact manner as does hybrid 10-1 except that the polarity of the gain through amplifier 24 is the exact reverse of the polarity of the gain through amplifier 22. This reversal would not be significant if ZO perfectly matched $Zl$ so that the output of amplifier 24 was canceled. However, since, as discussed above, some signal does pass through amplifier 24 this signal has a phase which is the exact reverse of the phase of the signal which passes through amplifier 22 resulting from the fact that the e signal output of amplifier 23 is applied to the +1 input of amplifier 24 while the voltage divided signal of $e/2$ is applied to the −2 input. The resulting signal (assuming a signal greater than $e/2$) is a signal having opposite phase. Since we have assumed that the signal input to all hybrids is similar, then the signal input ($e/2$) to all hybrids is either greater than $e/2$ or less than $e/2$. In either case, the resulting signal phase through the positive phase (P) hybrid is the opposite of the resulting signal gain through the negative phase (−P) hybrid. Since there is no 5dB pad between summing amplifiers 12 and 14, a 5dB pad is not required between the output of amplifier 24 and the −1 input of amplifier 23 of hybrid 11-1 to give cancellation.

GAIN ARRANGEMENTS

Figure 4:
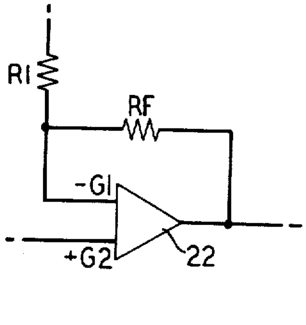
FIGS. 4 and 5 show details of phase control arrangements for establishing positive and negative phase through an operational amplifier.

FIG. 4 shows the manner in which the −1 and +2 gains of amplifier 22 of hybrid 10-1 are achieved based upon the following analysis:

$$\text{Gain G1} = -\frac{RF}{R1},$$

$$\text{making} \quad RF = R1 .$$

$$\text{Then G1} = -\frac{R1}{R1} = -1 .$$

$$\text{By design,} \quad G2 = 1 - G1 .$$

$$\text{Therefore,} \quad G2 = 1 - (-1) = +2 .$$

These, then are the positive reflection hybrid gains.

Figure 5:
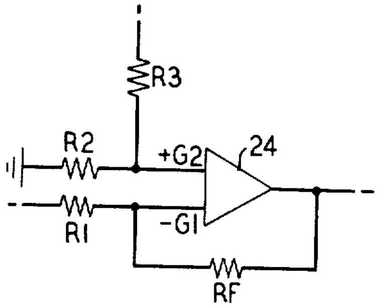

FIG. 5 shows the manner in which the +1 and −2 gains of amplifier 24 of hybrid 11-1 are achieved, i.e., $$\text{Gain } G1 = -\frac{RF}{R1},$$
$$\text{making } RF = 2R1.$$
$$\text{Then } G1 = -\frac{2R1}{R1} = -2.$$
$$\text{By design, } G2 = 1 - G1.$$

Therefore, if we used the same configuration as for the positive hybrid, $G2 = 1 - (-2) = 3$, which is wrong! Accordingly, a new divider circuit must be devised using R2 and R3 having the form $R3 = 2R2$, so that $$G2 = \frac{R2}{R2+R3}(1 - G1)$$
$$G2 = \frac{R2}{R2+2R2}(1 - G1) = \frac{1}{3}(3) = 1.$$

CONCLUSION

Although the invention has been shown in the context of a PBX time division switching system, it should be understood that any type of switching network could be utilized. Also, it should be understood that many values of gain could be utilized in the various operational amplifiers to give the result taught without departing from the spirit and scope of the invention.

Also, it should be understood that any other form of hybrid whose phase can be reversed could be utilized to give the result taught without departing from the spirit and scope of the invention.

What is claimed is:

1. A conferencing system for interconnecting a plurality of 2-wire communication devices, said system comprising:

a plurality of hybrids, each hybrid adapted for converting from 2-wire to 4-wire operation, said 4-wire portion of said hybrids including an output bus and an input bus;

means for interconnecting said output bus of each hybrid and for interconnecting said input bus of each of said hybrids, said interconnecting means including a summation means for communicating signals from said output bus to said input bus, said hybrids arranged in groups, a first group connected to certain ones of said communication devices and a second group connected to other ones of said communication devices, said first group of hybrids having means for establishing a signal having a first polarity with respect to any reflected transmission signals, said second group of hybrids having means for establishing a signal having a second polarity with respect to any reflected transmission signals; and means for enabling said interconnecting means of selected ones of said first group of hybrids and of selected ones of said second group of hybrids so that a conference connection is possible between said communication devices associated with said interconnected hybrids whereby the polarity differences of the reflected signals of said first group of hybrids and said second group of hybrids act to reduce the overall reflected signal.

2. The invention set forth in claim 1 wherein each said hybrid includes two amplifiers, each amplifier having two inputs and a single output, said amplifiers arranged so that the output of each is connected to a first one of the inputs of the other amplifier of the same hybrid, and said amplifiers further arranged so that the output of a first one of said amplifiers at each of said hybrids and a second input to the second one of said amplifiers at each of said hybrids are connected to an individual one of said communication devices.

3. The invention set forth in claim 2 wherein said amplifiers each have a noninverting positive input terminal, an inverting negative input terminal, and an output terminal, each said hybrid of said first group of hybrids comprising a connection from said output terminal of a first one of said amplifiers to said 2-wire portion of said hybrid and to said negative input terminal of said second amplifier, a connection from said 2-wire portion of said hybrid to said positive input terminal of said second amplifier, a connection from said output terminal of said second amplifier to said output bus and to said negative input terminal of said first amplifier, and a connection from said positive input terminal of said first amplifier to said input bus;

each said hybrid of said second group of hybrids comprising a connection from said output terminal of a first one of said amplifiers to said 2-wire portion of said hybrid and to said positive input terminal of said second amplifier, a connection from said 2-wire portion of said hybrid to said negative input terminal of said second amplifier, a connection from said output terminal of said second amplifier to said output bus and to said negative input terminal of said first amplifier, and a connection from said positive input terminal of said first amplifier to said input bus.

4. The invention set forth in claim 3 whereby, with respect to said first group of hybrids, the gain from said negative input terminal of each of said second amplifiers to said second amplifier output terminal is a value $-n$, where $n$ is any positive number, and the gain from said positive input terminal of each said amplifier to said amplifier output terminal is a value of $+2n$; and, with respect to said second group of hybrids, the gain from said second amplifier output is a value $-2n$ and the gain from said positive input terminal of each said amplifier to said amplifier output terminal is a value of $+n$.

5. In a communication system where a number of common interest stations are connectable to each other over line circuits and where any such station is connectable to other stations connected to the system over trunk circuits, an arrangement for establishing conference connections between selected ones of said stations served by said line circuits and up to two of said stations served by said trunk circuits, said arrangement comprising:

a plurality of hybrids, each hybrid adapted for converting from 2-wire to 4-wire operation, said 4-wire portion of each said hybrid including an output bus and an input bus and each said hybrid having the 2-wire input thereof connected to an individual one of said line circuits or to an individual one of said trunk circuits;

means for forming a station output bus by connecting together all said output buses of said hybrids connected to line circuits;

means for forming a station input bus by connecting together all said input buses of said hybrids connected to line circuits;

means for forming a trunk output bus by connecting together all said output buses of hybrids connected to trunk circuits;

means for forming a trunk input bus by connecting together all said input buses of hybrids connected to trunk circuits;

means, including a first summing amplifier, a second summing amplifier and a first transmission pad circuit, for connecting said station output bus to said station input bus so that transmission from any selected station served by a line circuit can be communicated to and from any other selected station served by a line circuit, said transmission between line-served stations having a transmission loss established by said first transmission pad circuit;

means, including a third summing amplifier and a fourth summing amplifier for connecting said trunk output bus to said trunk input bus so that transmission from any selected station served by a trunk circuit can be communicated to any selected station served by a trunk circuit, said transmission between trunk-served stations having no artificially introduced transmission loss;

means, including said second and said third summing amplifiers, for connecting said trunk output bus to said station input bus so that transmission from any selected station served by a trunk circuit can be communicated to any selected station served by a line circuit, said transmission having no artificially introduced transmission loss;

means, including said first summing amplifier and said fourth summing amplifier, for connecting said station output bus to said trunk input bus so that transmission from any selected station served by a line circuit can be communicated to any selected station served by a trunk circuit, said transmission having no artificially introduced transmission loss; and means for reducing the total reflected transmission signal of the system, said means including means in said hybrids connected to said line circuits for establishing a signal having a first polarity with respect to any reflected transmission signals originating therewithin, and means in said hybrids connected to said trunk circuits for establishing a signal having a second polarity with respect to any reflected transmission signals originating therewithin.

6. The invention set forth in claim 5 wherein each said hybrid includes two amplifiers, each amplifier having two inputs and a single output, said amplifiers arranged so that the output of each is connected to a first one of the inputs of the other amplifier of the same hybrid, said amplifiers further connected so that the output of a first one of said amplifiers at each of said hybrids and a second input to the second one of said amplifiers at each of said hybrids are connected to an individual one of said communicating devices.

7. The invention set forth in claim 6 wherein each of said hybrids connected to said line circuits further includes a second transmission pad circuit connected between said output of said second amplifier and said input of said first amplifier, said transmission pad circuit operable for introducing a transmission loss equal to said transmission loss introduced by said first transmission pad circuit.

* * * * *